(12) United States Patent
Trask

(10) Patent No.: US 11,231,343 B1
(45) Date of Patent: Jan. 25, 2022

(54) STORAGE TANK SAMPLING SYSTEMS

(71) Applicant: D'Arcy Trask, Crockett, CA (US)

(72) Inventor: D'Arcy Trask, Crockett, CA (US)

( * ) Notice: Subject to any disclaimer, the term of this patent is extended or adjusted under 35 U.S.C. 154(b) by 576 days.

(21) Appl. No.: 16/151,301

(22) Filed: Oct. 3, 2018

(51) Int. Cl.
*G01N 1/10* (2006.01)
*B65D 88/34* (2006.01)

(52) U.S. Cl.
CPC .............. *G01N 1/10* (2013.01); *B65D 88/34* (2013.01); *G01N 2001/1037* (2013.01)

(58) Field of Classification Search
CPC ... G01N 1/10; G01N 2001/1037; B65D 88/34
USPC ........................................ 73/863.81
See application file for complete search history.

(56) References Cited

U.S. PATENT DOCUMENTS

| | | | | |
|---|---|---|---|---|
| 1,857,537 A * | 5/1932 | Frank | ....................... | G01N 1/12 73/864.63 |
| 2,713,269 A * | 7/1955 | Neer | ........................ | G01N 1/12 73/864.52 |
| 3,442,017 A * | 5/1969 | Frenkel | ................... | G01F 23/04 33/717 |
| 4,346,519 A * | 8/1982 | Milo | ........................ | G01F 23/04 33/717 |
| 4,563,896 A * | 1/1986 | Arnold | ................ | G01F 23/0023 73/290 R |
| 4,729,437 A * | 3/1988 | Zapico | .................... | E21B 25/04 175/20 |
| 4,762,009 A * | 8/1988 | Scrudto | ................ | G01N 1/2035 73/863.21 |
| 4,790,197 A * | 12/1988 | Kimonides | .............. | G01N 1/12 73/864.65 |
| 5,094,113 A * | 3/1992 | Wood | ....................... | G01N 1/12 73/864.67 |
| 5,237,878 A * | 8/1993 | Hackenberg | ............ | G01N 1/14 73/861.34 |
| 5,831,185 A * | 11/1998 | Maxwell | ................. | E21B 7/124 73/864.45 |
| 6,179,084 B1 * | 1/2001 | Yamamoto | ............... | G01V 1/42 181/106 |
| 6,742,406 B2 * | 6/2004 | Dostie | ...................... | G01N 1/12 73/864.64 |
| 7,231,840 B1 * | 6/2007 | O'Kane | ................... | G01N 1/12 73/864.63 |
| 2008/0250879 A1 * | 10/2008 | Duff | ......................... | G01N 1/12 73/864.65 |

* cited by examiner

*Primary Examiner* — Nathaniel T Woodward
(74) *Attorney, Agent, or Firm* — Adibi IP Group, PC; Amir V. Adibi; Andrew C. Palmer

(57) ABSTRACT

A sampling device includes a pig-retaining pipe, a plurality of pipes extensions, a plurality of pipe couplings, a winch and support jig, a sample spout, a bottom cap, a pig, and a cable. A storage tank holds product-fuel, water, sludge, and a hard volume. The sampling device is used to collect and sample contents of the storage tank. The sampling device is assembled with the pig attached to a bottom cap coupled to the pig-retaining pipe. The sampling device is inserted into the storage tank to the desired depth. Contents of the storage tank enter into the sampling device through openings in the pig-retaining pipe. The winch is used to pull the cable upwards and draw the pig up through the sampling device. As the pig is pulled upwards, contents exit through the sample spout. The contents are stored in a container that is sent to a laboratory for analysis.

6 Claims, 16 Drawing Sheets

PIG BELOW SLOTTED OPENING OF THE SAMPLING DEVICE

PERSPECTIVE VIEW OF THE CROSS-SECTIONAL AREA
OF OPEN TOP STORAGE TANK

PIG BELOW SLOTTED OPENING OF THE SAMPLING DEVICE

PIG DRAWN UPWARDS THROUGH THE SAMPLING DEVICE

FIXED ROOF STORAGE TANK WITH THE SAMPLING DEVICE INSERTED

PERSPECTIVE VIEW OF COUPLING USED TO CONNECT PIPE ENDS

DECK LEG CONFIGURATIONS

SIDE-PERSPECTIVE VIEW OF THE PIG-RETAINING
PIPE WITH BOTTOM CAP ATTACHED

ENLARGED VERSION OF FIG. 7 SECTION A

THREADING THE SECOND END OF THE CABLE THROUGH THE
PIG-RETAINING PIPE AND EXTENSION PIPE

PERSPECTIVE VIEW OF THE UPPER END OF THE SAMPLING DEVICE

SIDE-PERSPECTIVE VIEW OF THE PIG

PERSPECTIVE VIEW OF THE BOTTOM CAP

USER ATTACHING A FIRST END OF A CABLE TO A PIG

USER INSERTING A PIG INTO A FIRST PIPE AND SECURING A BOTTOM CAP PRIOR TO INSERTING SAMPLING DEVICE INTO TANK

PIG BEING DRAWN FROM A LOWER END OF A SAMPLING
DEVICE TOWARD AN UPPER END OF A SAMPLING DEVICE

PACKAGING THE SAMPLING DEVICE

METHOD OF ASSEMBLING A STORAGE TANK SAMPLING DEVICE

METHOD OF EXTRACTING CONTENTS FROM A STORAGE
TANK USING A SAMPLING DEVICE

STORAGE TANK SAMPLING SYSTEMS

TECHNICAL FIELD

The described embodiments relate to bottom sediment and water surveying, and more particularly a device and method to sample sediment and water in storage tanks.

BACKGROUND INFORMATION

Storage tanks are containers that can be used to store liquid and gas. Storage tanks come in varying sizes and configurations. In the United States, aboveground storage tanks are generally cylindrical in shape, are perpendicular to the ground, and have either a fixed roof configuration or floating roof configuration. A fixed roof tank is meant for liquids with very high flash points, (e.g. product-fuel, water, bitumen etc.) Cone roofs, dome roofs, and roofs are usual. These are insulated to heat certain materials. Often heat is provided by steam coils within the tanks.

Floating roof tanks have a floating roof (or deck) installed in the inner diameter of the tank with the surface area floating on the liquid in the tank. An External Floating Roof (EFR) configuration occurs when the tank has an open top, whereas a floating roof inside a tank with a permanent fixed roof is said to have an Internal Floating Roof (IFR) configuration. IFRs are generally used for liquids with low flash-points (e.g. gasoline or ethanol). One example of a IFR is a cone roof tank with a floating roof inside which travels up and down along the liquid level. Floating roofs are supported with deck legs or cables. EFRs are generally used for liquids with medium flash-points such as naphtha, kerosene, diesel, and crude oil.

Storage tank maintenance is an important aspect for those operating refineries as well as in other industries. Tank failure can lead to many undesirable effects such as endangering human lives, adverse effect on the environment, and interruption of the operator's business. As a result, companies have a need for a consistent and reliable approach for assessing tank integrity as well as maintaining regulatory compliance.

One of the major problems with storage tanks is that over time, tanks become contaminated due to condensation, temperature changes, and the product itself. A thick layer of sludge typically develops at the bottom of the tank. This phenomenon is often referred to as "stratification". These solids are settled in suspension and are treated as hazardous waste. They often contain various types of heavy metal contaminants, carbon, and sometimes chemical pollutants. Sludge contaminated by chemical pollutants of heavy metals requires complex treatment. These undesirables reduce the amount of product output and potentially jeopardize tank integrity. Thus, it is imperative to find an effective way to remove these undesirables without interrupting plant operations while retaining as much product as possible.

One of the ways to solve this contamination problem is to prevent the buildup sludge and other undesirables by expelling them from the storage tank. Currently, tank operators clean their tanks on a routine basis with incomplete knowledge of the contents of their tank. This method has its shortcomings because the operator is unaware of any sludge accumulation until after the tank has been cleaned. As such, a shortcoming exists since the amount of sludge and undesirables cannot be determined until cleaning. A solution that overcomes these shortcomings is desired.

SUMMARY

A sampling device includes a pig-retaining pipe, a plurality of pipes extensions, a plurality of pipe couplings, a winch and support jig, a sample spout, a bottom cap, a pig, and a cable. A storage tank holds product-fuel, water, sludge, and a hard volume. The sampling device is used to collect and sample contents of the storage tank. The sampling device accesses a vertical sampling column that extends a depth of the storage tank. The entire vertical sampling column can be collected and sampled by drawing the pig up through the sampling device thereby causing contents within the sampling device to exit the sampling device. The entire vertical sampling column represents all vertical contents of the storage tank. Alternatively, portions of the column can be segregated so that only portions of the vertical sampling column are collected and sampled. In one example, only product is collected and sampled from the storage tank. In another example, only sludge (water and sediment) is collected and sampled.

The sampling device is assembled by attaching a first end of the cable to the pig. A second end of the cable is extended from the lower end of the pig-retaining pipe through the upper end of the pig-retaining pipe. The second end of the cable is passed through as many extension pipes as needed depending on a depth of the desired sample. The sample spout and winch and support jig are configured at the top of the storage tank. All the pipes are coupled together using the pipe couplings. The pig is inserted into the lower end of the pig-retaining pipe and attached to the bottom cap. The bottom cap is securely coupled to a bottom of the pig-retaining pipe. The pig is also referred to as a "stopper" or a "plug".

In operation, the sampling device extracts the contents of the storage tank. The sampling device is inserted into the storage tank to the desired depth. Contents of the storage tank enter into the sampling device through openings in the pig-retaining pipe. A vertical sampling column of the contents is disposed between a top surface of the pig and a top surface of contents within the storage tank. The winch is used to pull the cable upwards and draw the pig up through the sampling device. As the pig is pulled upwards towards a top surface of the storage tank, contents within the sampling device exit from the sample spout. The contents are stored in a container that is sent to a laboratory for analysis.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
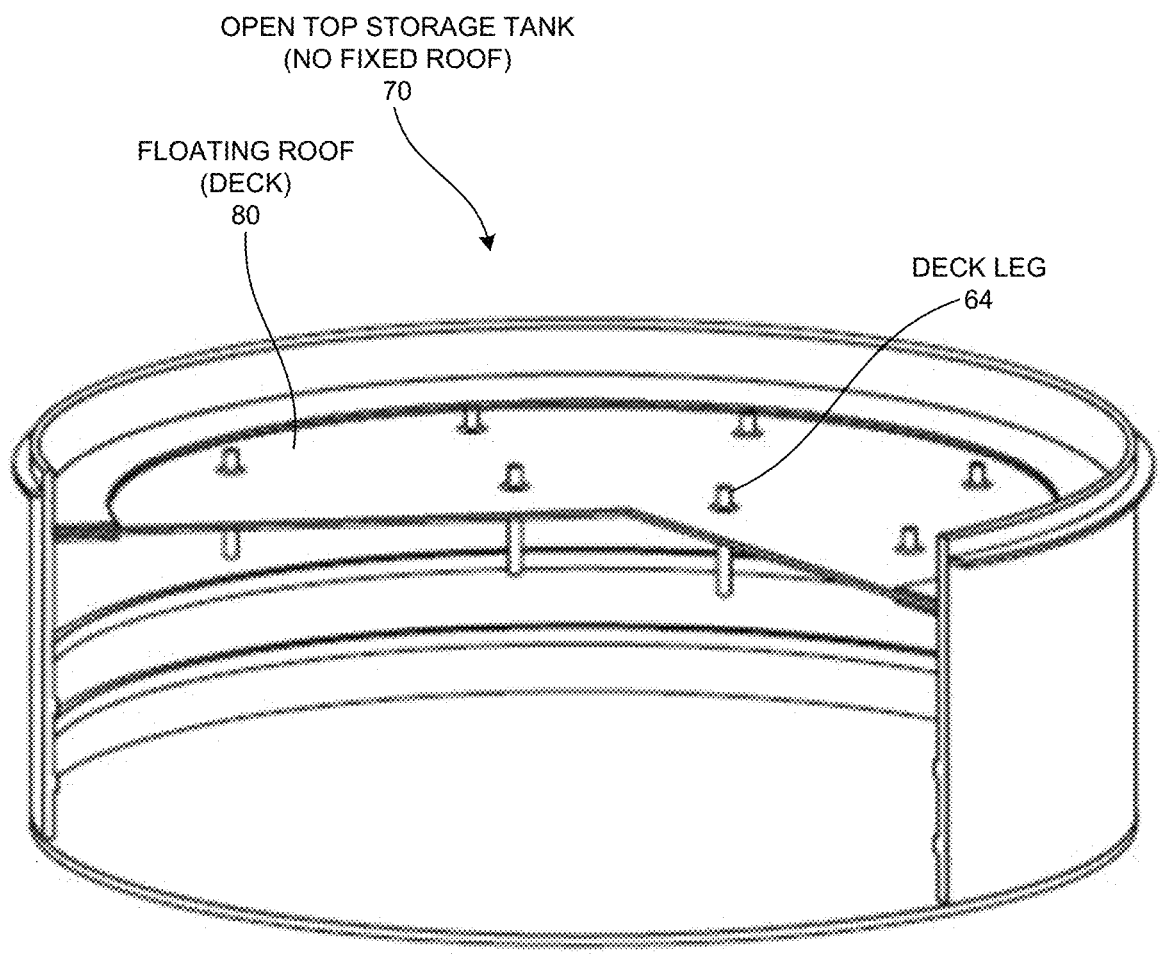
FIG. 1 is a diagram of a perspective view of the cross-sectional area of an open top storage tank.

FIG. 1 shows a perspective view of the cross-sectional area of an open top storage tank 70. In this example, the storage tank has an open top and multiple deck legs 64 used to support a floating roof (or deck) 80. A sampling device 10 is used to sample contents of the storage tank 70. In another example shown in FIG. 4, the sampling device 10 is used in a fixed roof storage tank 71. The sampling device 10 is versatile and is used in various types of storage tanks with floating roofs. When the storage tank has an open top, the floating roof is identified as an external floating roof, whereas when the storage tank has a closed top, the floating roof is identified as an internal floating roof.

Figure 2:
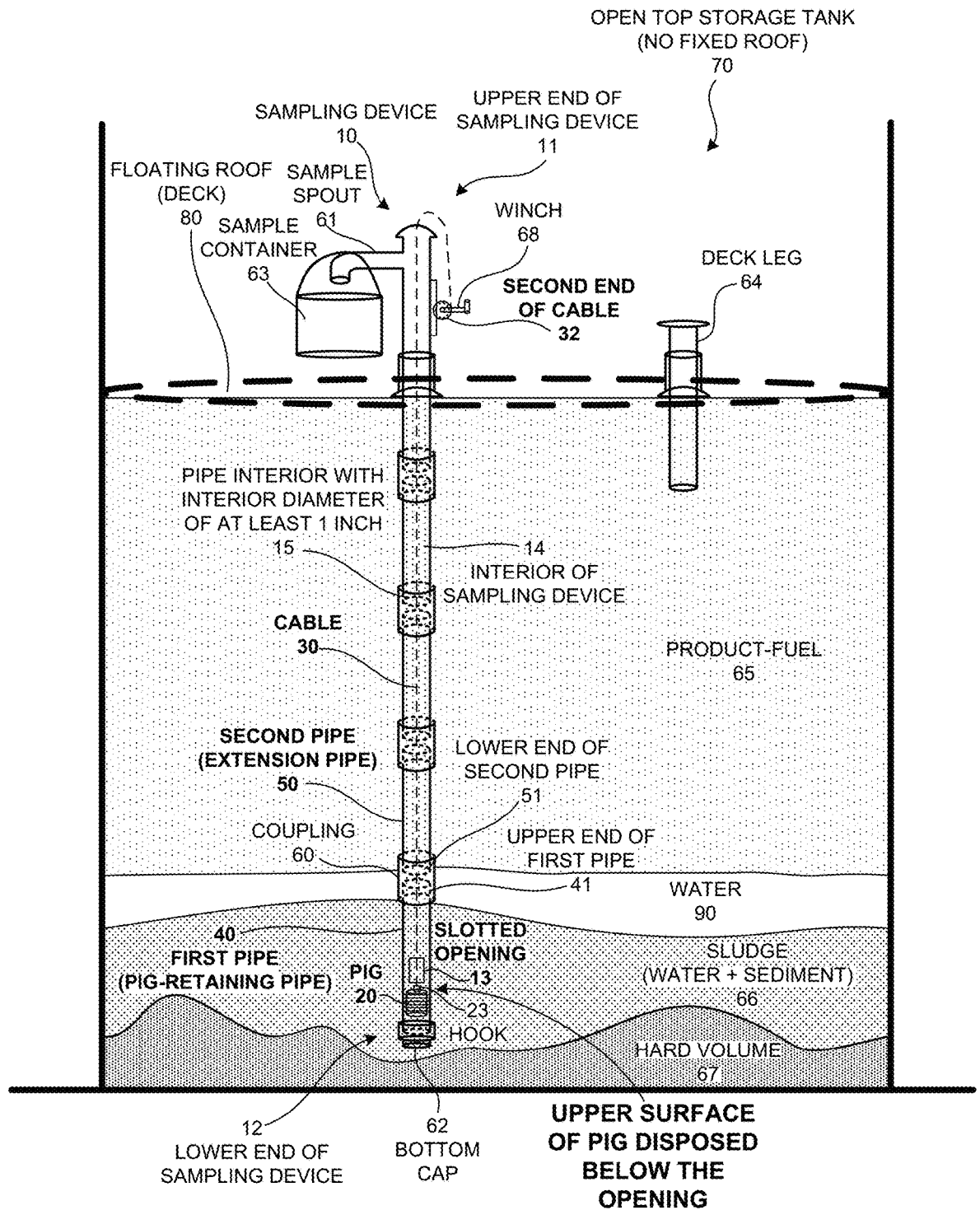
FIG. 2 is a diagram of an open top storage tank with an external floating roof with the sampling device inserted.

FIG. 2 is a diagram of an open top storage tank 70 with an external floating roof 80. A pig 20 is positioned below the slotted opening 13 of the lower end of the sampling device 10. In this example, one of the deck legs 64 is removed and a sampling device 10 is inserted into a sleeve where the deck leg was originally located (see FIG. 6 for the different types of deck leg configurations). The deck leg is a high leg. An upper end 11 of the sampling device 10 is located above the floating roof 80. The depth of a sampling device 10 will vary based on the number of extension pipes 50 attached. In the example in FIG. 2, there is a pig-retaining pipe 40 and three extension pipes 50 that are connected using couplings 60. In other examples, the sampling device 10 has versatility in that more or less extension pipes are used depending on the depth of the contents in the storage tank (e.g. product-fuel 65, water 90, sludge 66, and hard volume 67) and the users desired sampling location. In yet another example, the length of the sampling device 10 is at least 25-times, 50-times, 75-times, 100-times, or 1000-times more than an interior diameter of the pipe 15.

The contents of a storage tank can vary from tank to tank. For example, as shown in FIG. 2, the tank can hold product-fuel 65, water 90, sludge 66, and a hard volume 67. In one example, sludge comprises an amount of water 90 and an amount of sediment. In another example, sludge 66 may be another combination of other liquids and solids collected for sampling. In yet another example, the volume of the various liquids in the tank will have varying levels within the tank.

The sampling device 10 is used to collect contents of the storage tank using a cable 30 attached to the pig 20. The sampling device 10 is usable to collect and sample all contents of the storage tank 70. The sampling device 10 accesses a vertical sampling column that extends a depth of the storage tank 70. After the sampling device 10 is inserted into the tank 70 as in FIG. 2, the vertical sampling column extends from a top surface of the pig 20 disposed below a slotted opening 13 of the lower end of the sampling device 12 to a top surface of the contents of the storage tank 70. The entire vertical sampling column can be collected and sampled by drawing the pig up through the sampling device thereby causing contents within the sampling device 10 to exit through sample spout 61. The entire vertical sampling column represents all vertical contents of the storage tank 70. Alternatively, portions of the column can be segregated so that only portions of the vertical sampling column are collected and sampled. In one example, only product 65 is collected and sampled from the storage tank. In another example, only sludge 66 (water and sediment) is collected and sampled.

Figure 3:
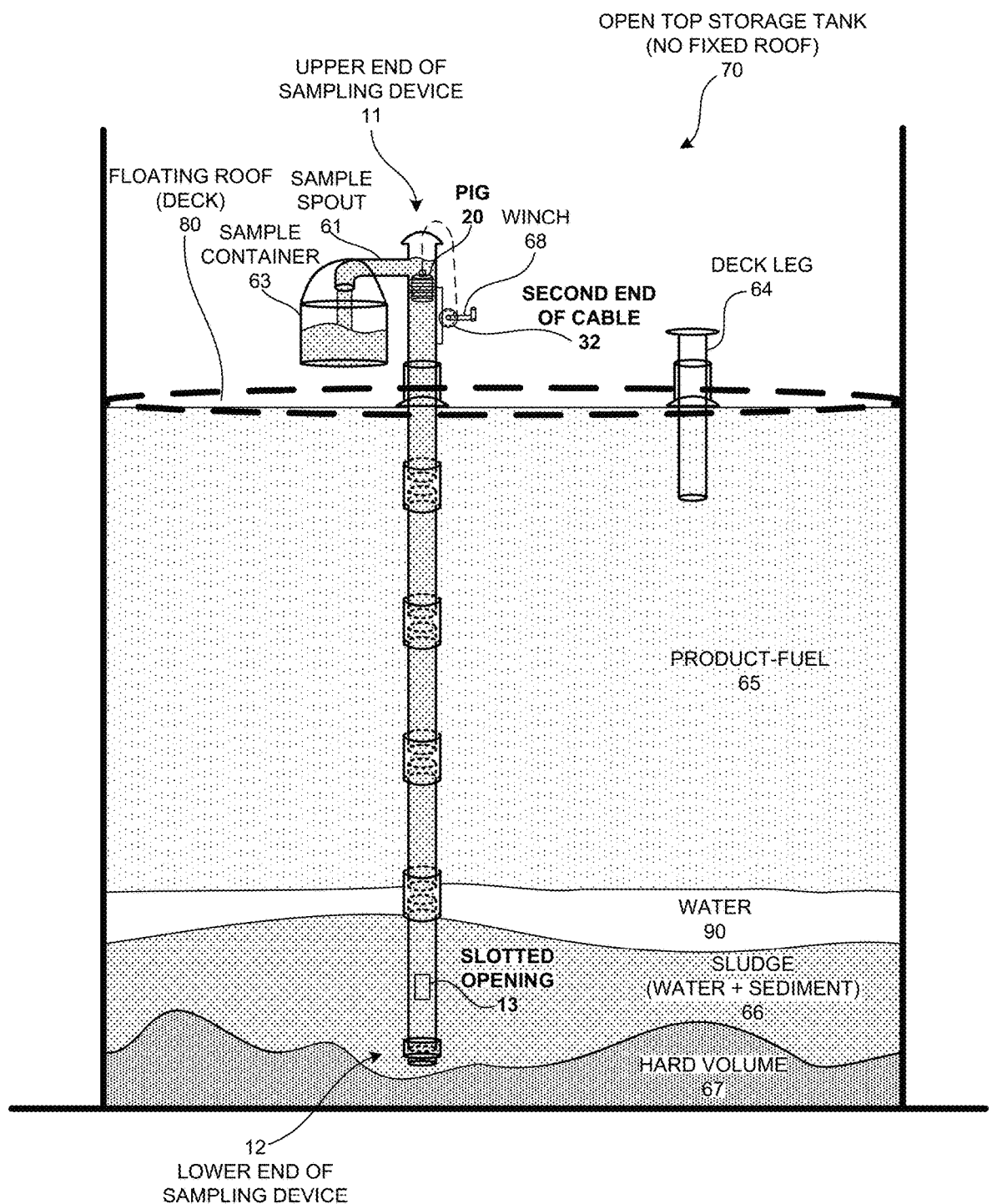
FIG. 3 is a diagram showing the pig being drawn upwards through the sampling device.

FIG. 3 is a diagram showing the pig 20 being drawn upwards through the sampling device 10. A second end of the cable 32 draws the pig 20 from the lower end 12 of the sampling device 10 to the upper end 11 of the sampling device 10. In this example, when the sampling device 10 is inserted into the storage tank, the slotted opening 13 is submersed into the sludge 66 that forms in the tank. As the pig 20 is drawn toward the upper end 11 of the sampling device 10, the pig 20 collects a sample of the contents of the storage tank that entered through the slotted opening 13. In addition, as the pig 20 is drawn toward the upper end 11 of the sampling device 10 the contents of the storage tank are expelled via a sample spout 61 into a sample container 63. The user is able to repeat this process with multiple sample stations (sleeves) to obtain the multiple samples (see FIG. 10).

Figure 9:
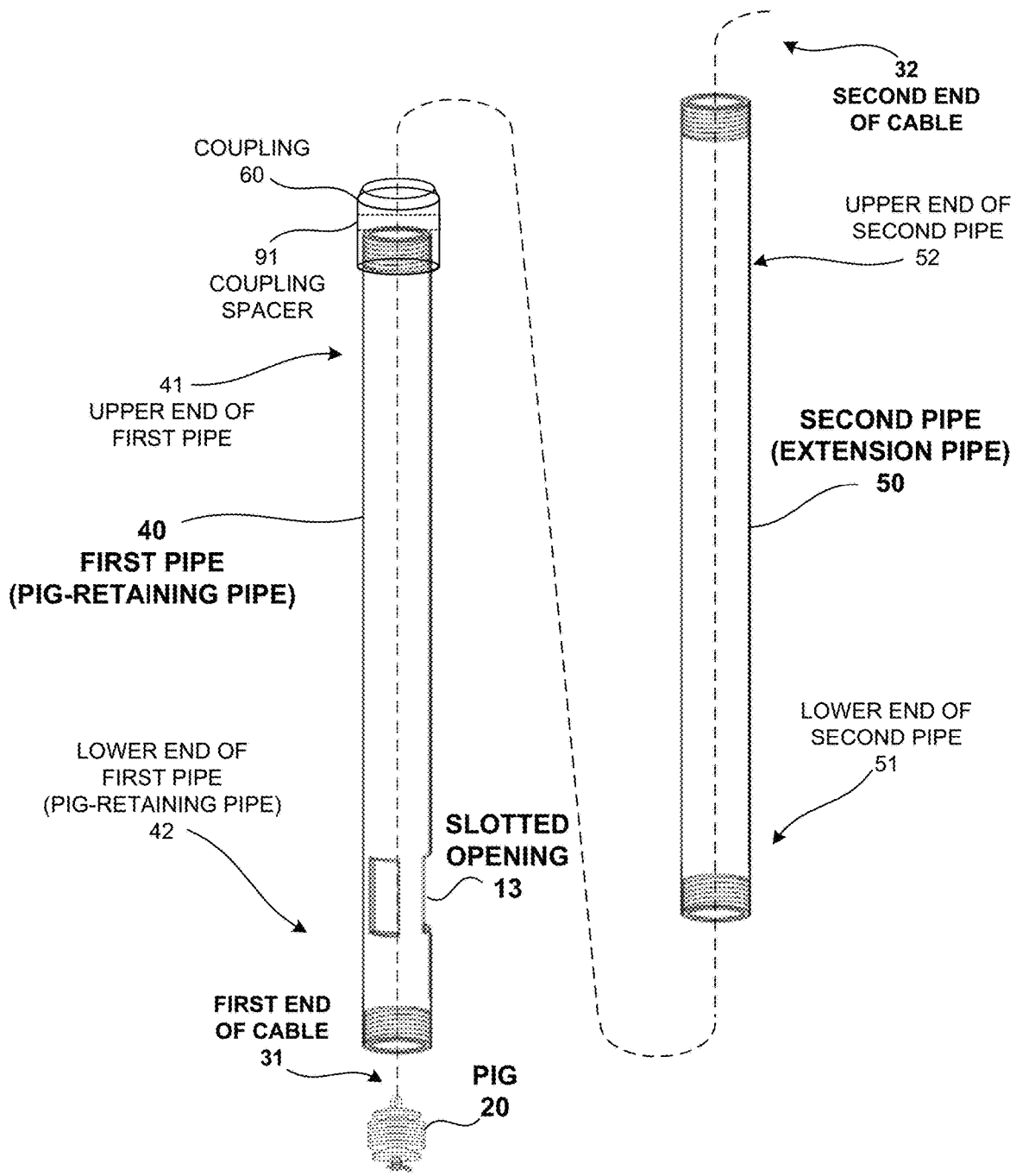
FIG. 9 is a diagram of the threading of a second end of a cable through a pig-retaining pipe and an extension pipe.

The sampling device 10 is an assembly using multiple extension pipes 50 between the upper end 11 and the lower end 12. FIG. 9 illustrates the process of threading the second end of a cable 32 through the pig-retaining pipe 40 and an extension pipe 50. In the example shown in FIG. 9, the cable is threaded through two pipes: the pig-retaining pipe 40 and one extension pipe 50. The upper end of the pig-retaining pipe 41 and the lower end of the extension pipe 51 are connected vertically using a coupling 60 (see FIG. 5 for a perspective view of a coupling). In another example, the lower end of another extension pipe is attached to the upper end of the second pipe (extension pipe) 50 using a coupling 60 and coupling spacer 91. In yet another example, there are at least two extension pipes between the lower end and the upper end of the sampling device 10. In yet another example, there are different types of couplings 60 that connect one end of a pipe to another.

Figure 4:
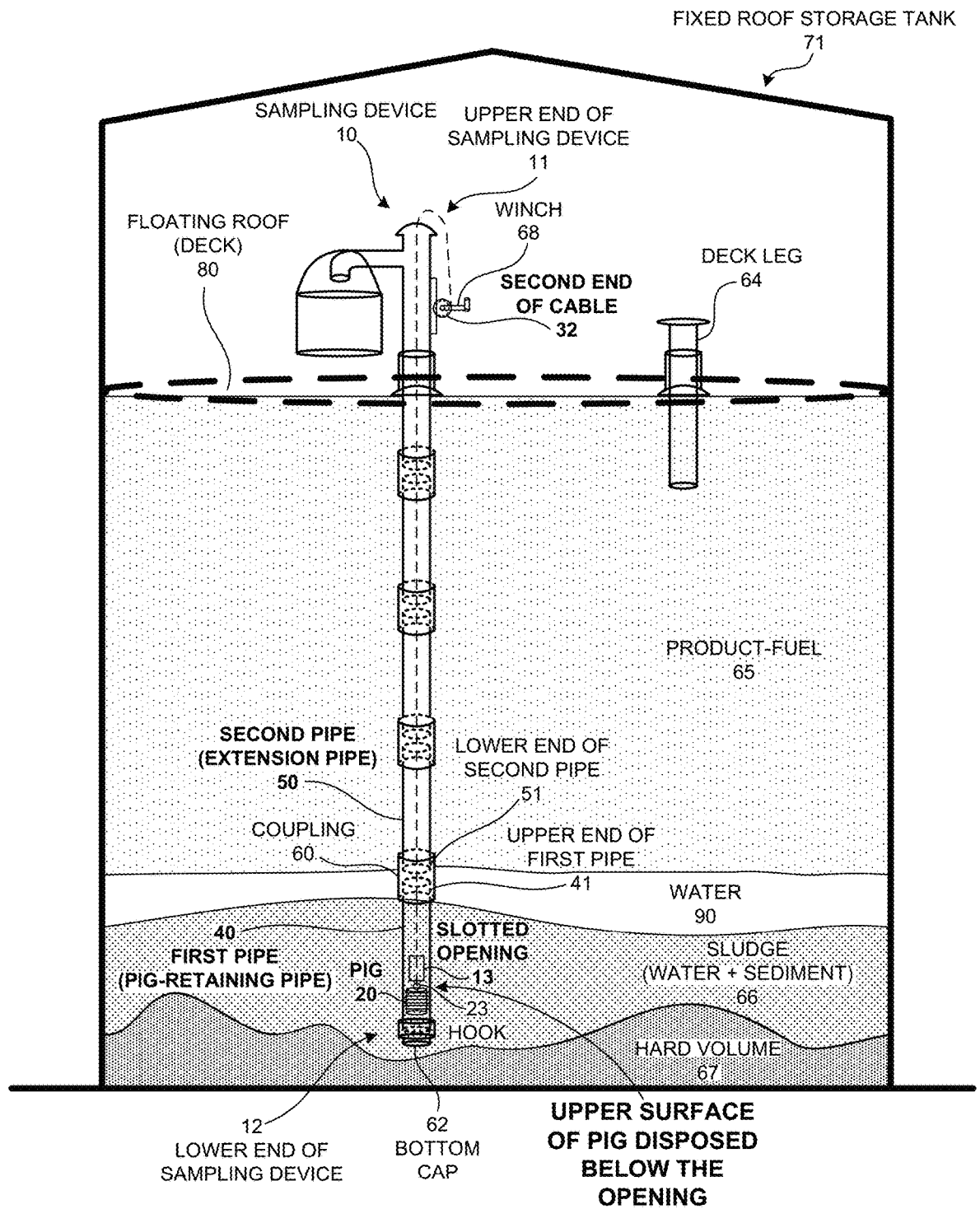
FIG. 4 is a diagram of a fixed roof storage tank with the sampling device inserted.

FIG. 4 is a fixed roof storage tank with an internal floating roof with the sampling device inserted. Similar to FIG. 3, the sample device 10 is inserted into a floating roof (deck) 80, but in this example, the storage tank is a fixed roof storage tank 71.

Figure 5:
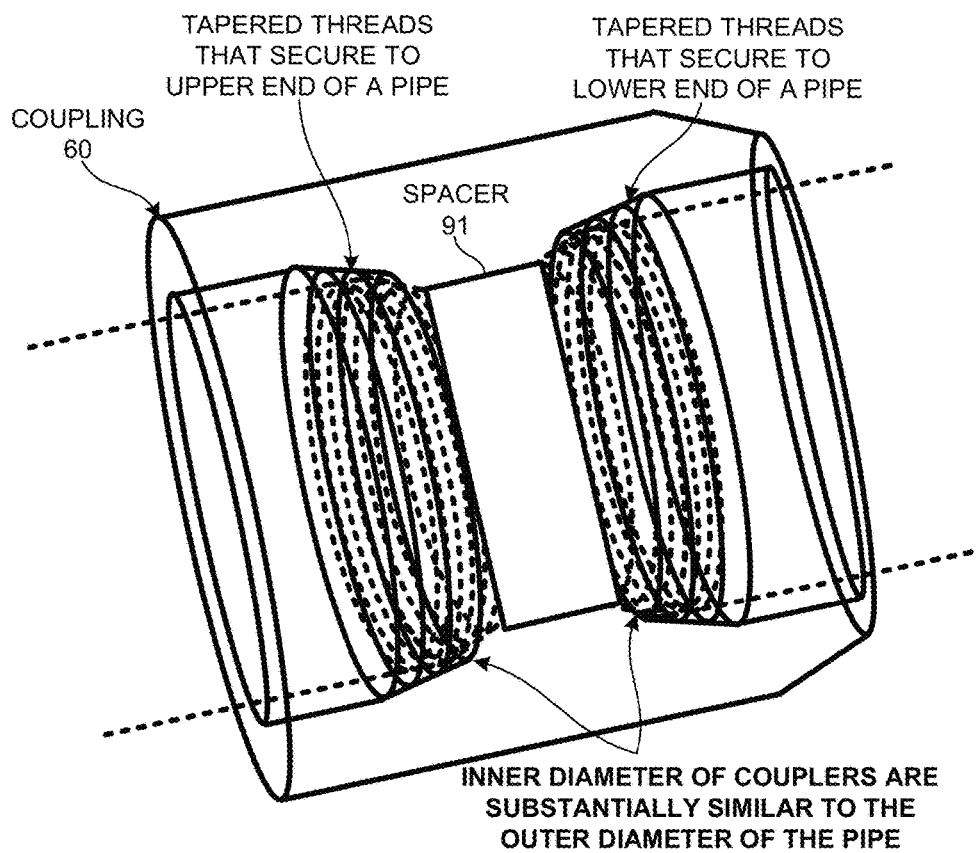
FIG. 5 is a diagram of a perspective view of a coupling used to connect pipe ends.

FIG. 5 is a perspective view of a coupling used to connect pipe ends. In this example, the lower side of the coupling 60 has tapered threads that secure to an upper end of a pipe (either pig-retaining 40 or extending pipe 50). In addition, the upper side of the coupling 60 has tapered threads that secure to a lower end of an extending pipe 50. In another example, the threads on both sides of the coupling 60 are compatible with both sides of the pig-retaining pipe 40 as well as any extending pipe 50. In between the two pipes is a spacer 91, usually made from latex, that prevents the product from leaking around the pig as it passes through connecting portions of the pipe. In addition, the inner diameter of the coupling is substantially similar to the outer diameter of the pipe(s). This is to ensure that the tapered threading of the coupling 60 fits securely to the pipe threading.

Figure 6:
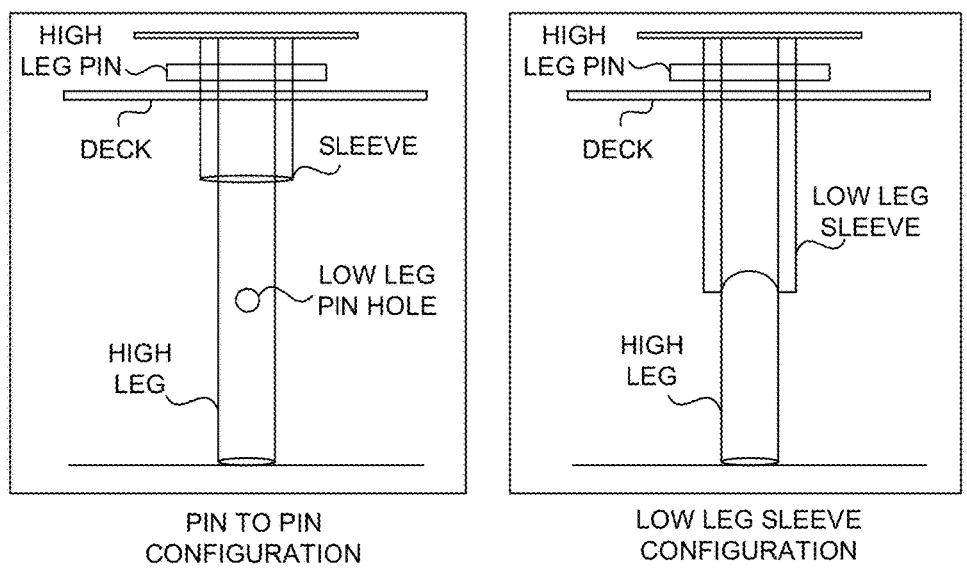
FIG. 6 is a diagram of the different types of deck leg configurations.

FIG. 6 shows the different types of deck leg configurations. A pin to pin configuration and a low leg sleeve configuration are illustrated in FIG. 6. In both configurations, the high leg is removed and the sampling device 10 accesses contents of the storage tank through the sleeve.

Figure 7:
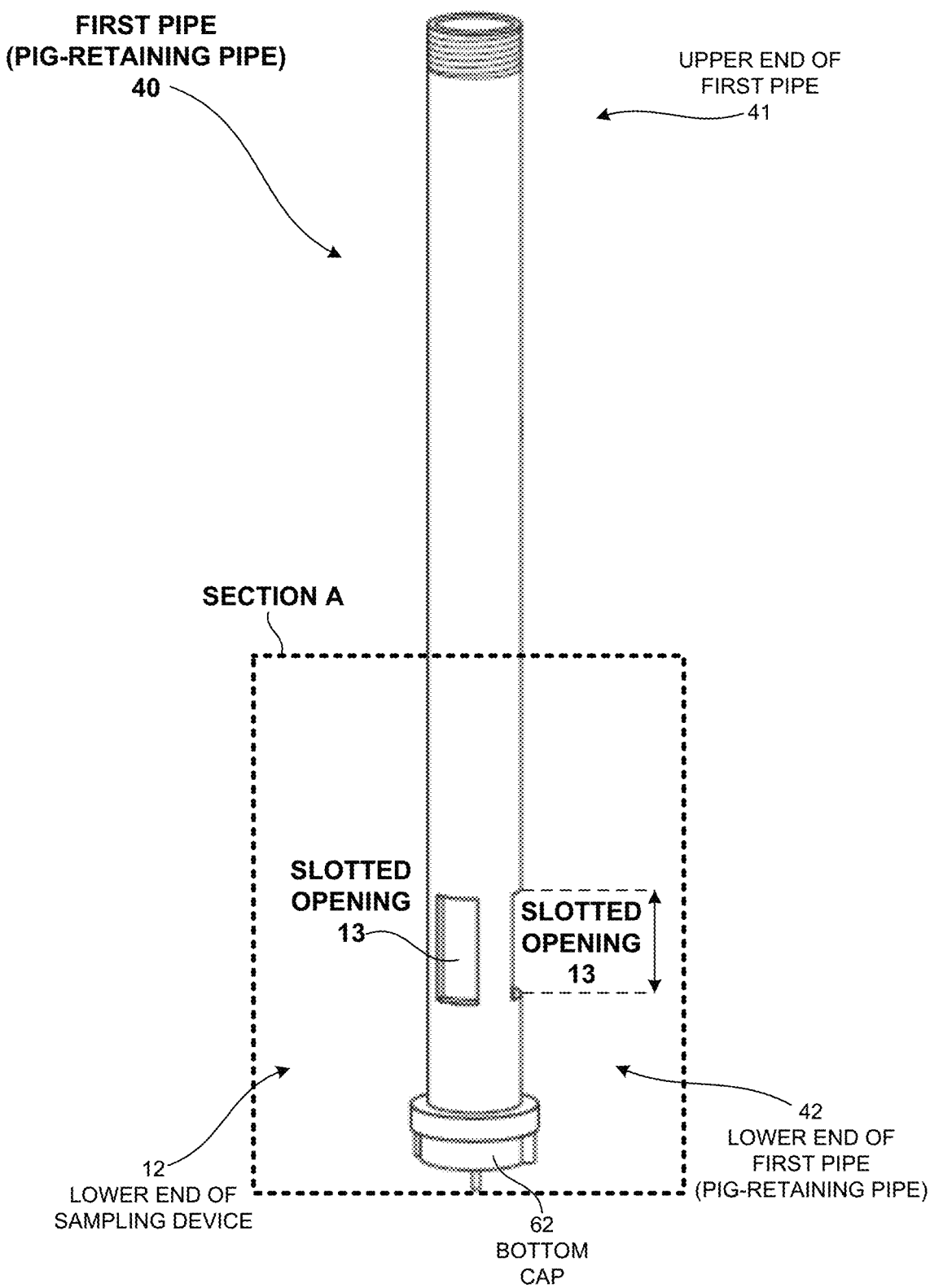
FIG. 7 is a diagram of a side-perspective view of a pig-retaining pipe with an attached bottom cap.

FIG. 7 is a side-perspective view of a pig-retaining pipe with an attached bottom cap. In this example, at least one dimension of each slotted opening 13 is less than the outer diameter of the pig 20 (see FIG. 13). Additionally, the pig-retaining pipe 40 has two slotted openings 13 on the lower end of the sampling device 12. In another example, the pig-retaining pipe 40 has three slotted openings 13. In yet another example, the pig-retaining pipe 40 has more than three slotted openings 13. In yet another example, the pig-retaining pipe 40 has less than two slotted openings 13. In yet another example, the slotted opening(s) 13 are located on the upper end of the pig-retaining pipe 41. In addition, the lower end of the pig-retaining pipe 42 has threads that allow a bottom cap 62 to be attached when desired.

Figure 14:
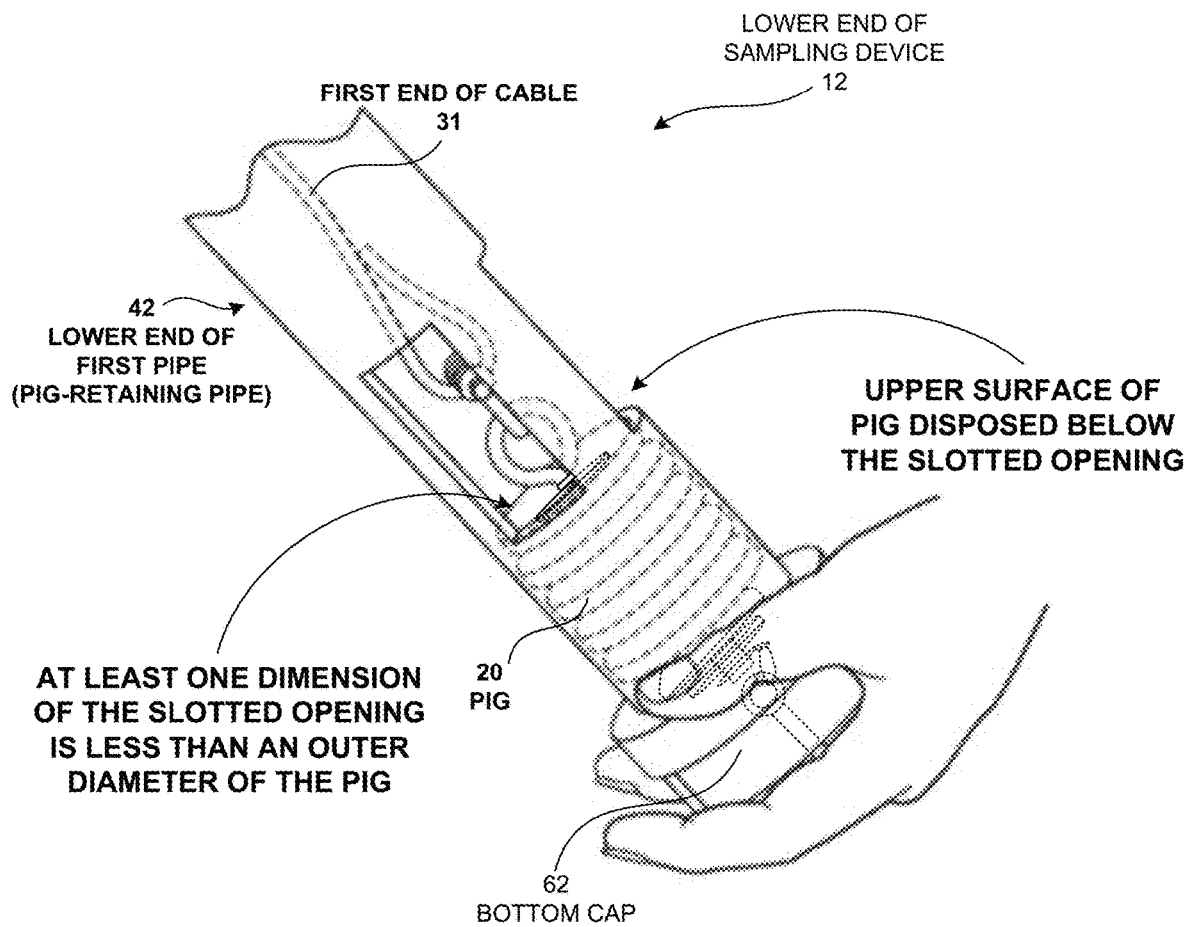
FIG. 14 is a diagram of a user inserting a pig into a first pipe and securing a bottom cap prior to inserting sampling device into tank.

In addition, the bottom cap 62 will usually be secured to the lower end of the pig retaining pipe 42 after the pig 20 has been inserted into the lower end of the pig retaining pipe 42 (see FIG. 14). In one example, shown in FIG. 2, the pig-retaining pipe 40, and extension pipe(s) 50 each have an interior diameter of at least one inch 15. The diameter of the interior of the sampling device 14 (or each segment of the sampling device 10) is smaller than the outer diameter of the pig 20 (see FIGS. 11 and 15). In another example, the interior diameter of the pipe 15 may be 2 inches, 3 inches, 4 inches, 5 inches, or more, and respectively, the outer diameter of the pig 20 would be substantially equivalent to the interior diameter of the pipe 15. The outer diameter of the pig 20 is not too large as to prevent it from being drawn through the sampling device 10. If the pig 20 were too large in diameter, then the pig 20 would not pass through the pipes. FIG. 14 illustrates one example having three slotted openings on the lower end of the pig-retaining pipe 42. At least one dimension of the slotted opening is less than an outer diameter of the pig 20. All widths of the opening are less than a diameter of the pig 20 thereby preventing the pig from exiting the sampling device as the pig 20 is drawn through the slotted area. In another example, there may be more or less slotted openings along different areas of the sampling device 10.

Figure 8:
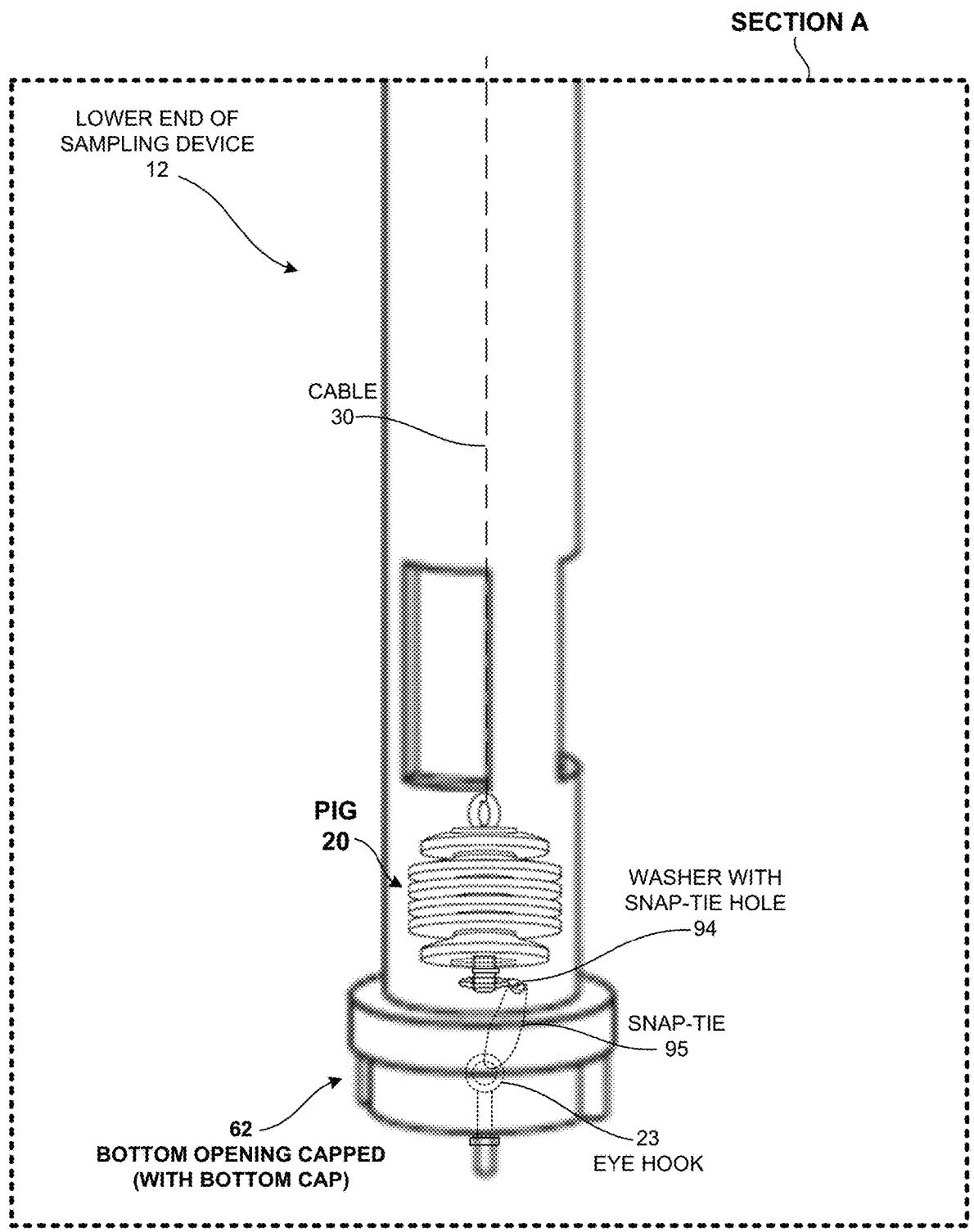
FIG. 8 is a diagram of an enlarged version of FIG. 7 Section A.

FIG. 8 is a diagram of an enlarged version of FIG. 7 Section A. In this example, the pig 20 is attached to the cable 30 and has been inserted into the lower end of the sampling device 12. The lower surface of the pig 20 has a bent washer 94 with a hole used to secure a snap-tie 95. The bottom opening of the lower end of the sampling device 12 is capped. The snap-tie 95 attaches the washer with a snap-tie hole 94 to the eyehook 23 within the bottom cap 62.

FIG. 9 illustrates threading a second end of a cable through a pig-retaining pipe and an extension pipe. In this example, the pig 20 is attached to the first end of a cable 31. Then, the coupling 60 is attached to the upper end of the pig-retaining pipe 41 and the lower end of the extension pipe 51 with a coupling spacer 91 in between. Then, the second end of the cable 32 is threaded through the upper end of the first pipe 41, through the coupling 60, and through a lower end of the extension pipe 51 through an upper end of the extension pipe 52. In another example, the second end of the cable 32 is threaded through another coupling 60 connected to an additional extension pipe, until the extension pipe is connected to the upper end of the sampling device 10.

Figure 10:
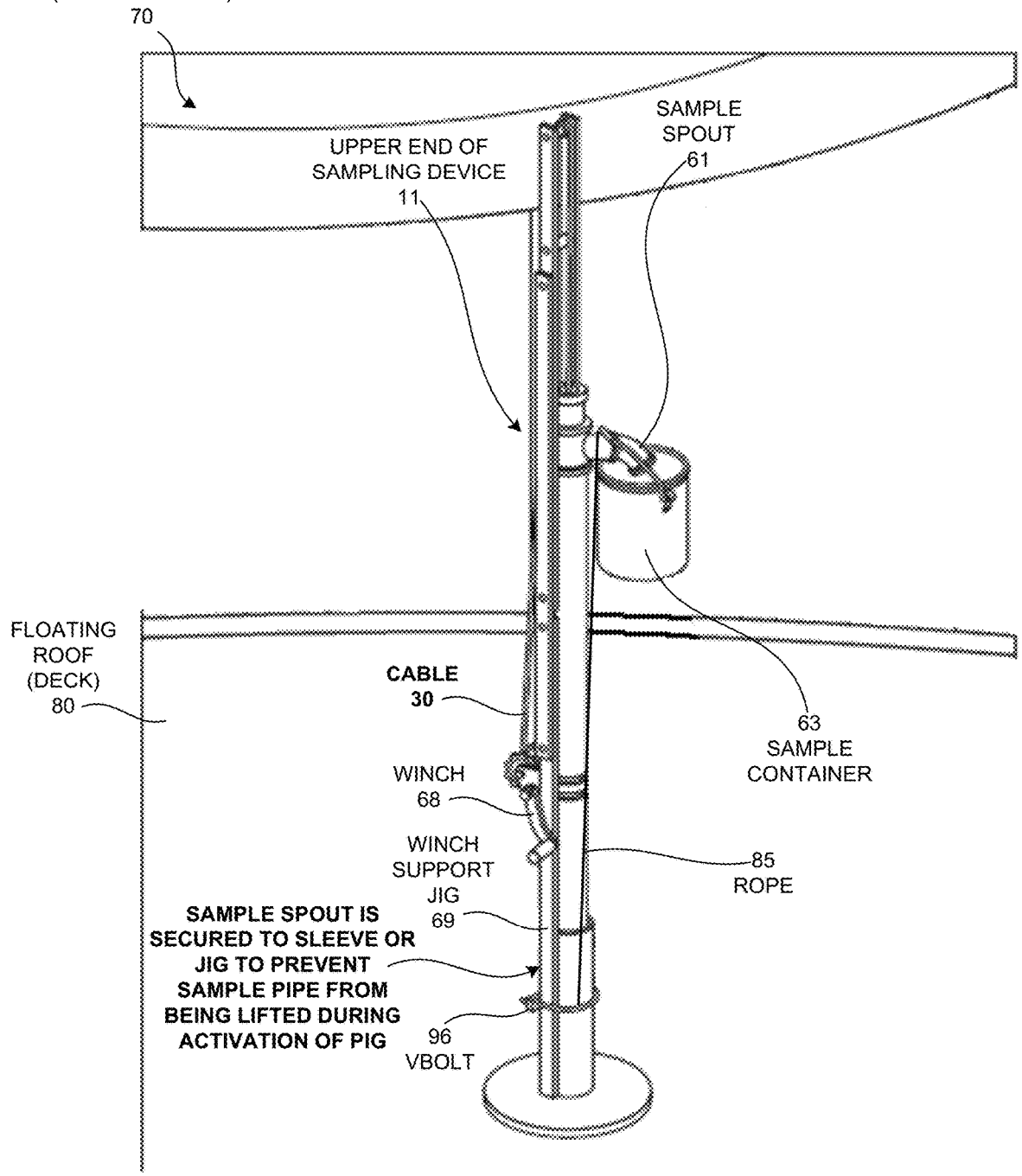
FIG. 10 is a diagram of a perspective view of an upper end of a sampling device.

FIG. 10 is a perspective view of an upper end of a sampling device. In the example shown in FIG. 10, the upper end of the sampling device 11 is located above the floating roof 80 and has a cable 30, attached to a winch 68, supported by a winch support jig 69, a vbolt 96, a rope 85, as well as a sample spout 61 and a sample container(s) 63. In addition, the second end of the cable 32 is threaded around the winch 68 which provides the user the ability to draw the first end of the cable 31 (with pig attached) through the sampling device 10. In addition, the rope 85 is attached to the vbolt 96 and the sample spout 61 to help stabilize the sleeve. In another example, the second of the cable 32 is attached to a different mechanism that also allows the user the ability to draw the pig through the sampling device 10. Additionally, the sample spout 61, also located on the upper end of the sampling device 11, is used to fill the sample container 63 with the contents of the storage tank (see FIG. 3).

Figure 11:
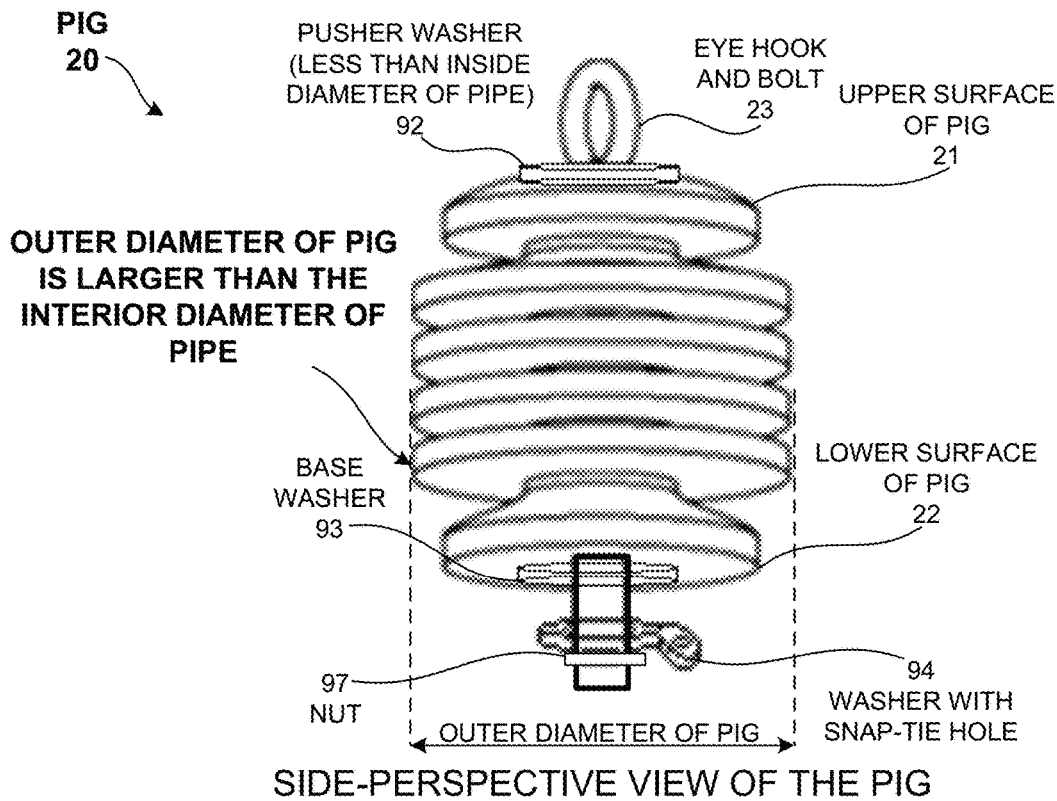
FIG. 11 is a diagram of a side-perspective view of a pig.

FIG. 11 is a side-perspective view of a pig. In this example, a pusher washer 92 and an eye hook and bolt 23 is located along the upper surface of the pig 21. This eye hook 23 attaches to the cable 30 which allows the pig 20 to be pulled through the sampling device 10. In addition, a base washer 93, a washer with snap-tie hole 94, and a nut 97 are located on the lower surface of the pig 22. The washer 94 is bent and has an additional hole that allows for a snap-tie to be secured to it. Furthermore, the outer diameter of the pig 20 is larger than to the pipe interior diameter of the sampling device 15 (see FIG. 15). In yet another example, the pig 20 has a different design and is made of different material.

Figure 12:
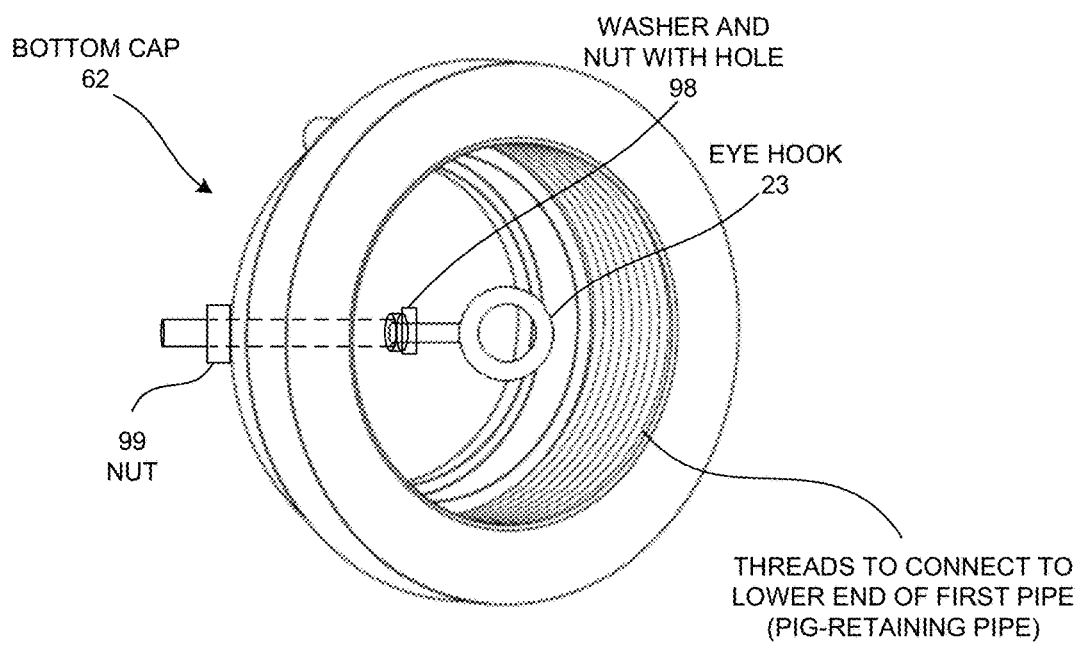
FIG. 12 is a diagram of a perspective view of a bottom cap.

FIG. 12 is a perspective view of a bottom cap. In this example, the bottom cap 62 has threads connect to the lower end of the pig-retaining pipe 42 (see FIG. 8). In addition, on the inside of the bottom cap 62 there is a hole in the center, which allows an eyehook 23 and washer with nut 98 to be secured via a nut 99 on the outside of the bottom cap. This eyehook 23 is used to connect the snap-tie 95 to the bottom of the pig 20 (see FIG. 8). In another example, the bottom cap 62 has threads that are compatible with an extension pipe 50.

Figure 13:
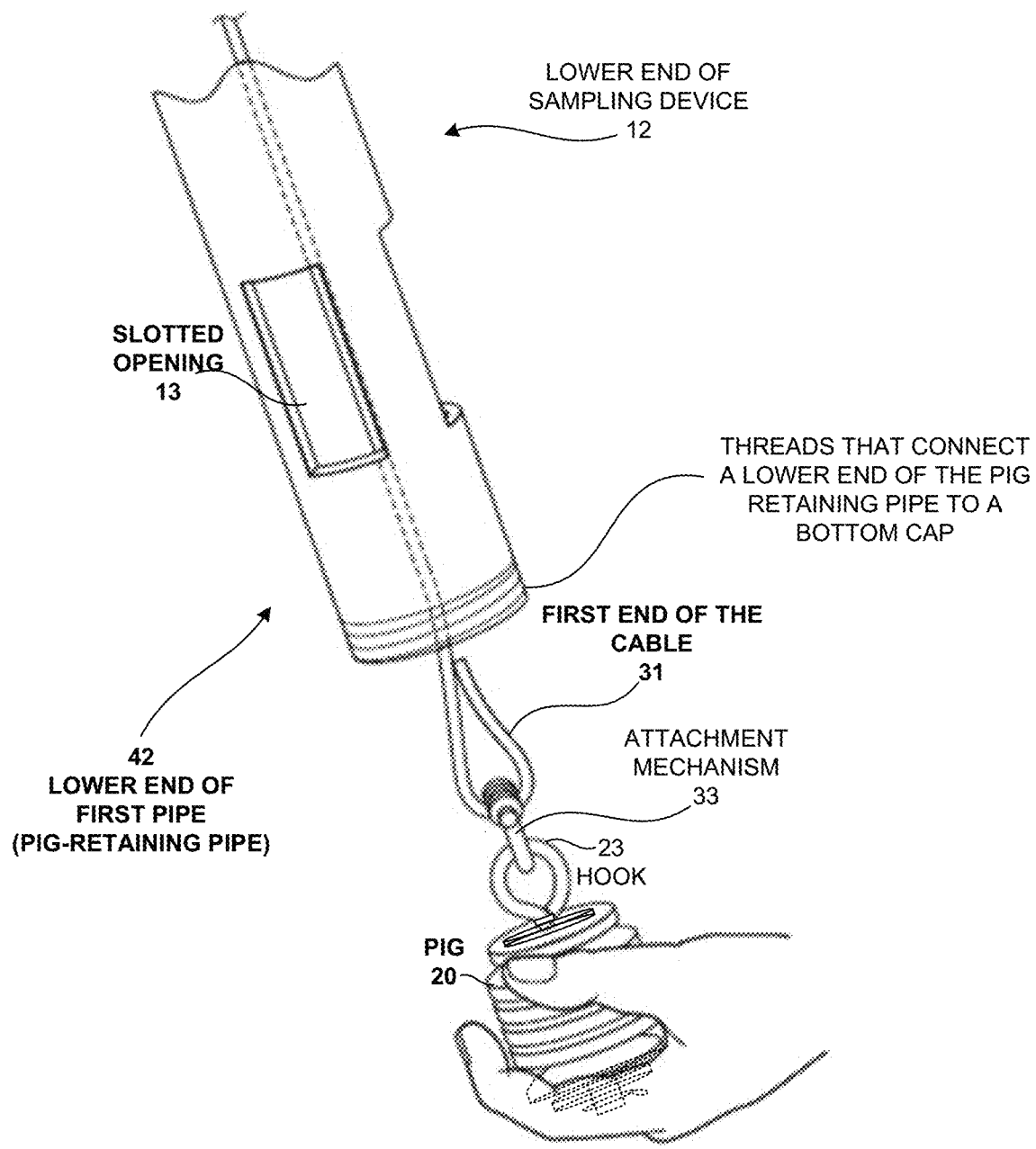
FIG. 13 is a diagram of a user attaching a first end of a cable to a pig.

FIG. 13 shows a user attaching a first end of a cable to a pig. In this example, the user attaches the first end of the cable 31 to the hook 23 on the upper surface of the pig 20 using the attachment mechanism 33.

FIG. 14 shows a user inserting a pig into a first pipe and securing a bottom cap prior to inserting sampling device into the tank. In this example, the user inserts the pig 20 (that is attached to the first end of the cable 31) into the lower end of the pig-retaining pipe 42. Then, the user secures the bottom cap 62 to the lower end of the pig-retaining pipe 42. Initially, the upper surface of the pig 20 is disposed below the slotted opening(s) 13. The width dimension of each slotted opening 13 is less than an outer diameter of the pig 20. This is to prevent the pig 20 from unintentionally exiting the slotted opening(s) 13 when being drawn towards the upper end 11 of the sampling device.

Figure 15:
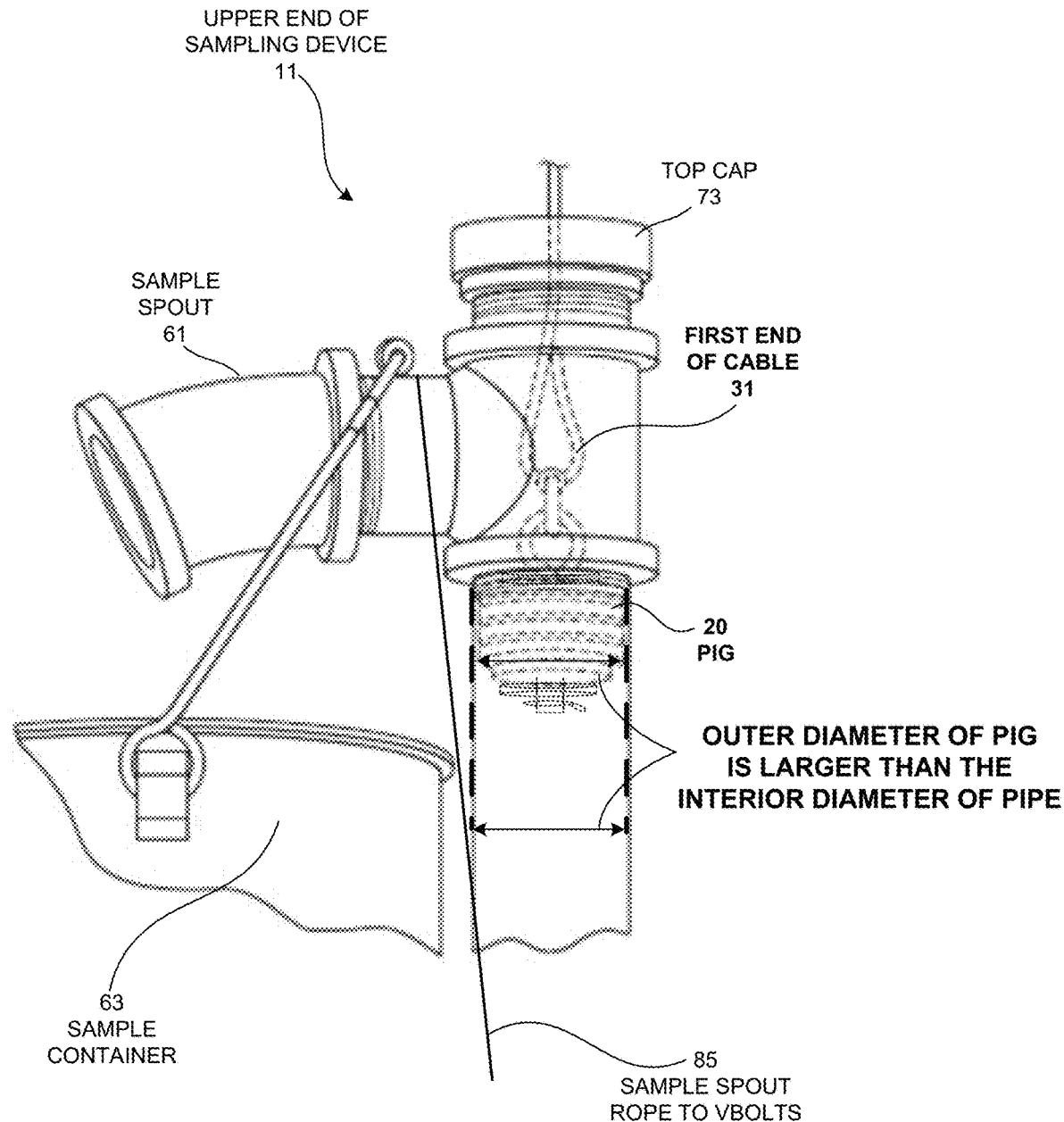
FIG. 15 is a diagram of a pig being drawn from a lower end of a sampling device toward an upper end of a sampling device.

FIG. 15 shows a pig being drawn from a lower end of a sampling device toward an upper end of a sampling device. In this example, the pig 20 has been drawn to the upper end 11 of the sampling device 10 with an attached top cap 73. In addition, the outer diameter of the pig 20 is substantially similar to the interior diameter of the pipe (pig-retaining or extension) 15. In another example, the sampling device 10 is inserted into a storage tank (open top 70 or fixed top 71) and the contents of the storage tank are expelled via the sample spout 61 into the sample container 63.

Figure 16:
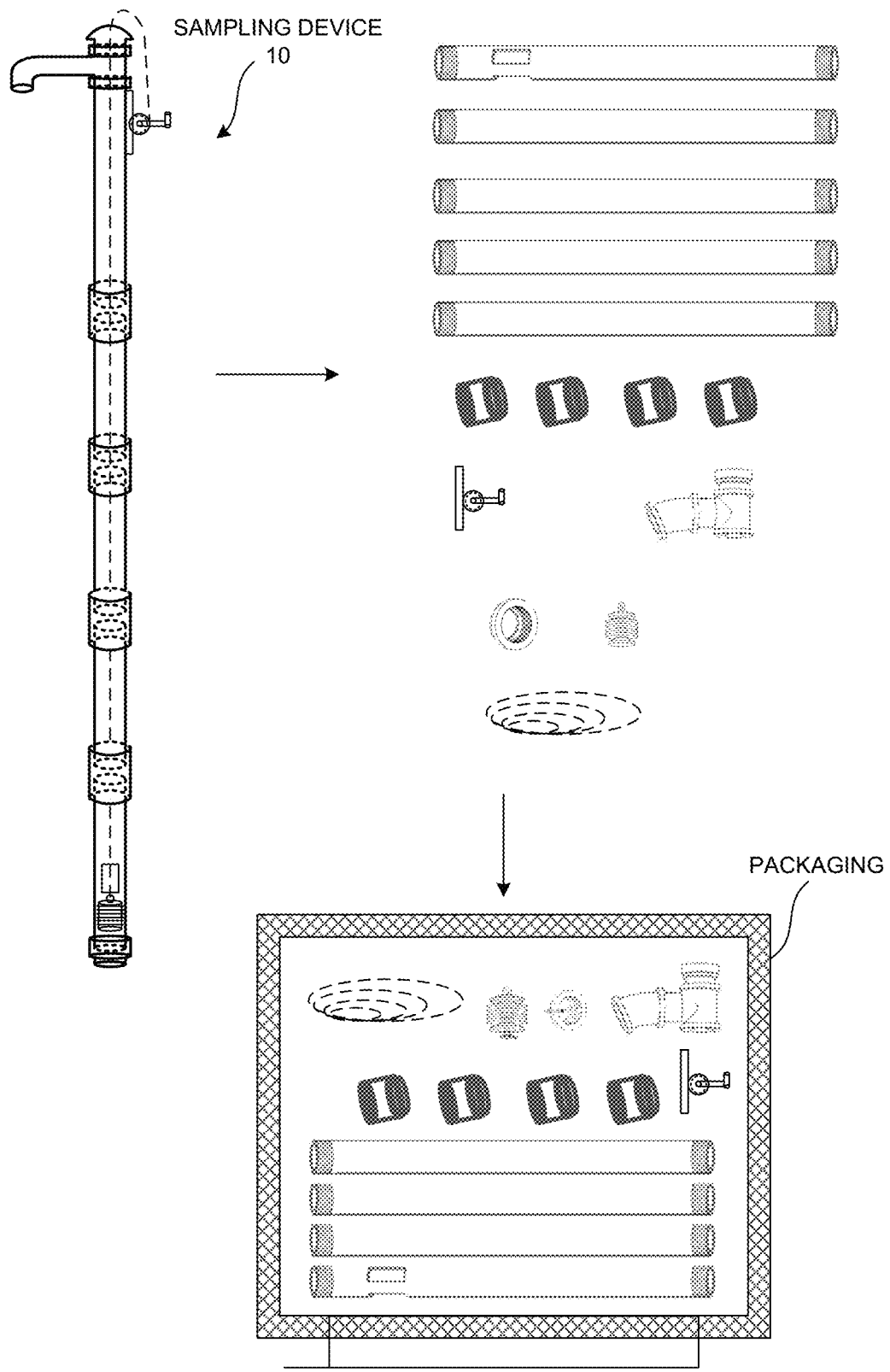
FIG. 16 is a diagram of the process of packaging a sampling device.

FIG. 16 shows the process of packaging a sampling device 10. In this example, the sampling device 10 is disassembled into its respective components: one pig-retaining pipe 40, three extension pipes 50, four couplings 60, one winch 68 (with the winch support jig 69), one sample spout 61 (with top cap 73), one bottom cap 62, one pig 20, and one cable 30. In another example, there are more or less extension pipes 50 and couplings 60. The components of the sampling device 10 are packaged into a package accordingly. The assembly and disassembly of the novel sampling system is highly practical because the system can be easily transported to multiple storage tank sites.

Figure 17:
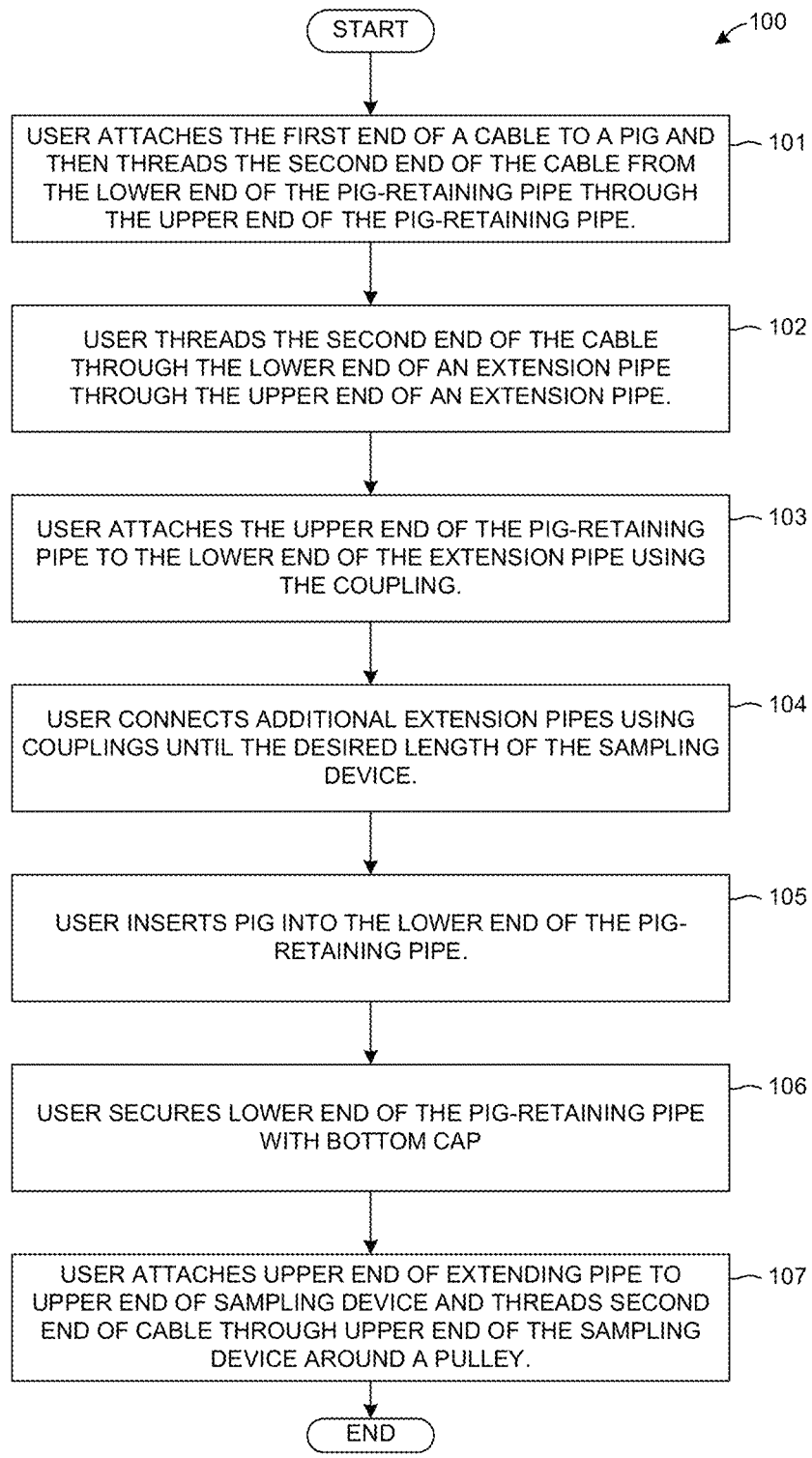
FIG. 17 is a flowchart for assembling a storage tank sampling device.

FIG. 17 is a flowchart of a method 100 for assembling a storage tank sampling device in accordance with one novel aspect. In a first step (step 101), the user attaches the first end of a cable 31 to the pig 20 and then threads the second end of the cable 32 from the lower end of the pig-retaining pipe 42 through the upper end of the pig-retaining pipe 41 (see FIG. 13). In a second step (step 102), the user threads the second end of the cable 32 through the lower end of an extension pipe 51 through the upper end of an extension pipe 52 (see FIG. 9). In a third step (step 103), the user attaches the upper end of the pig retaining pipe 41 to the lower end of the extension pipe 51 using a coupling 60 (see FIG. 9). In a fourth step (step 104), the user connects additional extension pipes 50 using couplings 60 until the desired length of the sampling device 10. In a fifth step (step 105), the user inserts the pig 20 into the lower end of the pig-retaining pipe 42. In a sixth step (step 106), the user secures the lower end of the pig-retaining pipe 42 with the bottom cap 62. In a seventh step (step 107), the user attaches the upper end of the extending pipe 50 to the upper end 11 of the sampling device 10 and threads the second end of the cable 32 through the upper end of the sampling device 11 around a winch 68.

Figure 18:
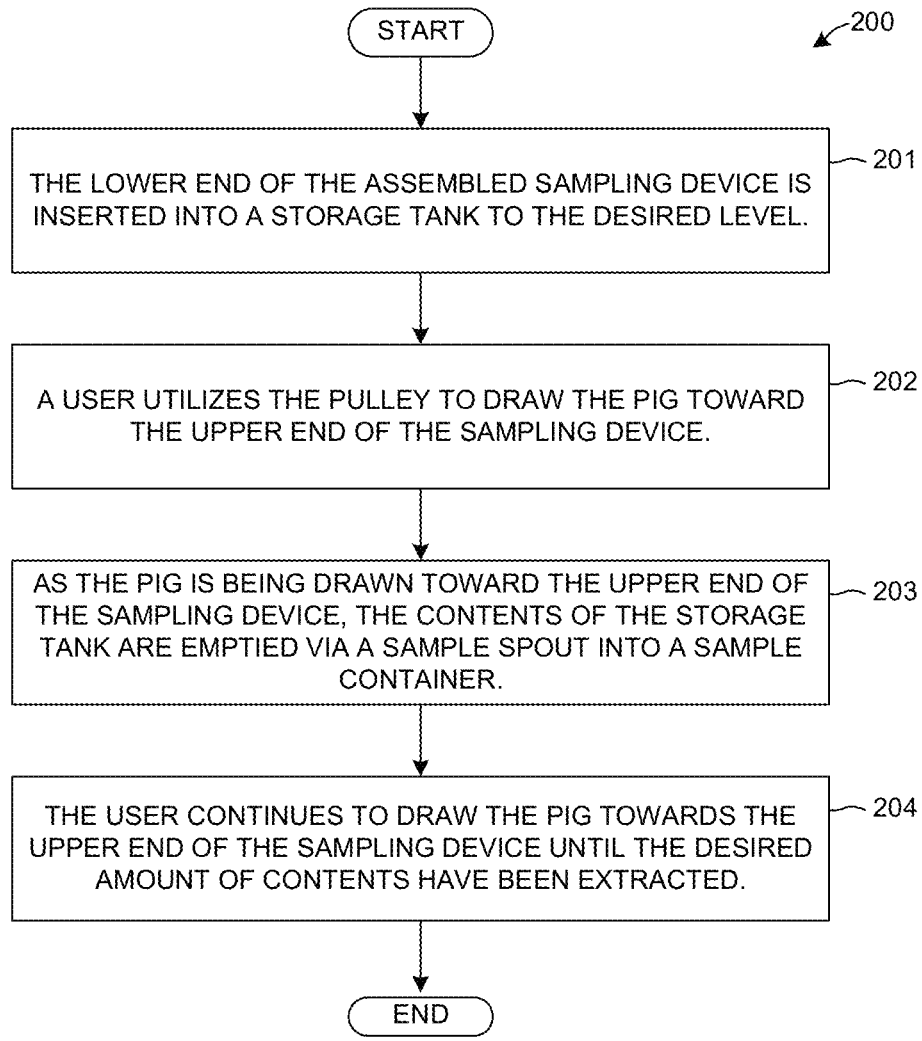
FIG. 18 is a flowchart for extracting contents from a storage tank using a sampling device.

FIG. 18 is a flowchart of a method 200 for extracting contents of a storage tank using a sampling device in accordance with one novel aspect. In a first step (step 201), the lower end of the assembled sampling device 12 is inserted into a storage tank to the desired level. In a second step (step 202), a user utilizes the winch 68 to draw the pig 20 toward the upper end 11 of the sampling device 10. In a third step (step 203), as the pig 20 is being drawn toward the upper end 11 of the sampling device 10, the contents of the storage tank are emptied via a sample spout 61 into a sample container 63. In a fourth step (step 204), the user continues to draw the pig 20 towards the upper end 11 of the sampling device 10 until the desired amount of contents have been extracted.

Although certain specific exemplary embodiments are described above in order to illustrate the invention, the invention is not limited to the specific embodiments. For example, although the sampling system is shown having multiple pipes connected with couplings, in another embodiment, a sampling system comprises a single, unitary pipe structure that extends into the storage tank. A bottom end of the sampling system has at least one opening and retains a pig below the at least one opening. A top end of the sampling system has an upper opening for contents to be expelled. The sampling system is inserted into the storage tank and contents flow into the at least one opening. A cable attached to the pig is drawn upwards causing the pig to draw contents within the sampling system out through the upper opening. Accordingly, various modifications, adaptations, and combinations of various features of the described embodiments can be practiced without departing from the scope of the invention as set forth in the claims.

What is claimed is:

1. A method comprising:
   (a) placing a sampling device into a tank such that an amount of water and sediment mixture contained within the tank is drawn through an opening disposed along a lower end of the sampling device, wherein the sampling device comprises a plug and a cable, wherein the cable is attached to an upper surface of the plug, wherein the plug is below the opening of the sampling device, and wherein after the placing of (a), an upper end of the sampling device is disposed above a deck of the tank such that the cable extends from the lower end of the sampling device to the upper end of the sampling device; and
   (b) drawing the plug out of the sampling device by pulling the cable out of the upper end of the sampling device.

2. The method of claim 1, wherein the water and sediment mixture is sludge.

3. The method of claim 1, wherein the placing of (a) further comprises:
   (a2) attaching a cover to the lower end of the sampling device such that no contents of the tank are drawn through the lower end of the sampling device and only contents of the tank drawn into the sampling device are drawn through the opening of the sampling device.

4. The method of claim 3, wherein the placing of (a) further comprises:
   (a3) coupling a lower end of a pipe to the upper end of the sampling device, wherein the pipe has a lower opening and an upper opening, wherein the pipe has no opening on an outer surface of the pipe between the upper opening and the lower opening; and
   (a4) attaching a spout to the upper end of the pipe such that when the plug is drawn out of the sampling device, water and sediment mixture disposed within the sampling device is expelled from the spout.

5. A method comprising:
   (a) placing a sampling device into a tank such that an amount of water and sediment mixture contained within the tank is drawn through an opening disposed along a lower end of the sampling device, wherein the sampling device comprises a plug and a cable, wherein the cable is attached to an upper surface of the plug, wherein the plug is below the opening of the sampling device, and wherein after the placing of (a), an upper end of the sampling device is disposed above a deck of the tank such that the cable extends from the lower end of the sampling device to the upper end of the sampling device;
   (b) drawing the plug out of the sampling device by pulling the cable out of the upper end of the sampling device; and
   (c) collecting contents of the sampling device into a container.

6. A method comprising:
   (a) placing a sampling device into a tank, wherein the tank is a fixed roof tank or a floating roof tank, such that an amount of water and sediment mixture contained within the tank is drawn through an opening disposed along a lower end of the sampling device, wherein the sampling device comprises a plug and a cable, wherein the cable is attached to an upper surface of the plug, wherein the plug is below the opening of the sampling device, and wherein after the placing of (a), an upper end of the sampling device is disposed above a deck of the tank such that the cable extends from the lower end of the sampling device to the upper end of the sampling device;

(b) drawing the plug out of the sampling device by pulling the cable out of the upper end of the sampling device; and (c) collecting contents of the sampling device into a container.

\* \* \* \* \*